(12) United States Patent
Jongbloedt et al.

(10) Patent No.: US 11,951,674 B2
(45) Date of Patent: Apr. 9, 2024

(54) PROCESS AND SYSTEMS FOR WINDING A FILAMENT AROUND A WINDING SUPPORT

(71) Applicant: PLASTIC OMNIUM NEW ENERGIES FRANCE, Lyons (FR)

(72) Inventors: Mathieu Jongbloedt, Brussels (BE); Filip Beyens, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 18/548,235

(22) PCT Filed: Mar. 8, 2022

(86) PCT No.: PCT/EP2022/055838
§ 371 (c)(1),
(2) Date: Aug. 29, 2023

(87) PCT Pub. No.: WO2022/189406
PCT Pub. Date: Sep. 15, 2022

(65) Prior Publication Data
US 2024/0042673 A1 Feb. 8, 2024

(30) Foreign Application Priority Data
Mar. 8, 2021 (LU) ........................................ 102629

(51) Int. Cl.
*B29C 53/60* (2006.01)
*B29C 53/66* (2006.01)
(Continued)

(52) U.S. Cl.
CPC .......... *B29C 53/607* (2013.01); *B29C 53/602* (2013.01); *B29C 53/665* (2013.01);
(Continued)

(58) Field of Classification Search
None
See application file for complete search history.

(56) References Cited

U.S. PATENT DOCUMENTS

| 4,750,960 A | 6/1988 | Bubeck |
| 2005/0184188 A1 | 8/2005 | Weg |

FOREIGN PATENT DOCUMENTS

JP 62-263027 A 11/1987

OTHER PUBLICATIONS

International Search Report dated May 20, 2022 in PCT/EP2022/055838, filed on Mar. 8, 2022, 3 pages.

*Primary Examiner* — Jacob T Minskey
*Assistant Examiner* — Adrianna N Konves
(74) *Attorney, Agent, or Firm* — Oblon, McClelland, Maier & Neustadt, L.L.P.

(57) ABSTRACT

A process for winding a filament around a winding support. The winding support has a cylindrical shape with dome-shaped longitudinal ends and a roll axis, and is held by a holding device fixed to a base. The process includes the following, occurring in synchronization, feeding a filament, by means of at least one feeding device, towards the winding support, rotating the winding support with respect to the base around a pitch axis of the winding support, rotating unlimitedly the at least one feeding device around a yaw axis of the winding support with respect to the base, and/or rotating unlimitedly the winding support around the yaw axis of the winding support with respect to the base, and rotating unlimitedly the winding support with respect to the base around the roll axis of the winding support.

20 Claims, 2 Drawing Sheets

(51) Int. Cl.
    *B29C 53/70*          (2006.01)
    *B29C 53/80*          (2006.01)
    *B29C 53/82*          (2006.01)
    *B29C 70/32*          (2006.01)
    *B29K 77/00*          (2006.01)
    *B29K 105/08*        (2006.01)
    *B29K 307/04*        (2006.01)
    *B29K 309/08*        (2006.01)

(52) U.S. Cl.
    CPC .......... B29C 53/70 (2013.01); B29C 53/8066 (2013.01); B29C 53/825 (2013.01); B29C 70/32 (2013.01); *B29K 2077/10* (2013.01); *B29K 2105/08* (2013.01); *B29K 2307/04* (2013.01); *B29K 2309/08* (2013.01)

PROCESS AND SYSTEMS FOR WINDING A FILAMENT AROUND A WINDING SUPPORT

CROSS REFERENCE TO RELATED APPLICATIONS

This application is a National Stage entry under 35 U.S.C. § 371 of PCT/EP2022/055838, filed on Mar. 8, 2022, and claims priority to Luxembourg Patent Application No. LU102629, filed on Mar. 8, 2021. The entire contents of both are incorporated herein by reference.

The invention relates to high pressure vessels for vehicles. More precisely, the invention relates to a process for winding a filament around a winding support and systems for winding a filament around a winding support.

High pressure vessels for vehicle generally comprise a hollow container, like a bladder under the form of a mandrel, having a general cylindrical shape with dome-shaped longitudinal ends and made of plastic material, such material being chosen for being lightweight and cheap to produce, or other material. This container is intended for storing gas under pressure, for example dihydrogen, to be used by the vehicle equipped with the pressure vessel for diverse functions, such as source of power. The gas under pressure exerts strong constraints on the inner surface of the container which may damage the integrity of the container and cause hazardous leakage, especially with combustible gas like dihydrogen.

To improve the mechanical properties of the container, it is known to wind a filament made of a reinforcing fibre, for example carbon fibre, all around the container thus forming a winding support. The filament is embedded in a resin to facilitate the winding and to make sure each piece of the outer surface of the winding support is covered. This winding operation is necessary but takes quite a long time and it is desired to reduce as much as possible the duration of this operation to not overly lengthen the manufacturing time of the pressure vessel. The document U.S. Pat. No. 3,333,778A discloses a winding system and a winding process implemented by said winding system.

This document proposes a somewhat fast process for winding the filament around the winding support, but there is still room for improvement. Indeed, using this system, the filament feeding speed varies greatly during the winding process, it notably slows down when laying the filament around the longitudinal ends of the winding support. This results in a loss of time and thus a quite long winding process. Consequently, the productivity of the winding system is not optimal and the winding process is not time-optimized.

In the view of above, there exists a need for reducing the duration of the winding operation while allowing all known winding patterns optimize the production cost and speed of high pressure vessels.

To this end, it is provided according to the invention a process for winding a filament around a winding support having a general cylindrical shape with dome-shaped longitudinal ends and having a roll axis, the winding support being held by a holding device fixed to a base, the process comprising steps, occurring in synchronization, consisting of:
(i) feeding a filament, by means of at least one feeding device, towards the winding support,
(ii) rotating the winding support with respect to the base around a pitch axis of the winding support,
(iiiA) rotating unlimitedly the at least one feeding device around a yaw axis of the winding support with respect to the base, and/or
(iiiB) rotating unlimitedly the winding support around the yaw axis of the winding support with respect to the base, and
(iv) rotating unlimitedly the winding support with respect to the base around the roll axis of the winding support.

By allowing more degrees of freedom to the movements of the at least one feeding device and the winding support, it is possible to speed up the winding process. Indeed, by composing in synchronization the movements of these elements relative to each other, it is possible to optimize the pathing and the pace of the filament fed by the at least one feeding device to the winding support. As such, the filament feeding speed is more constant than in the document of the prior art previously cited. When the filament is laid on areas of the winding support where the feeding speed must decrease in the prior art, it is here possible to move the winding support, and the at least one feeding device in the case of step (iiiB), in a manner to need a less important deceleration of the feeding speed without impacting the winding path, thus reducing the duration of the winding operation. In other words, the process permits to have a more constant speed of filament feeding from the at least one feeding device, decreasing the duration of the winding operation.

By the expression "filament", it is meant continuous fiber tows, preferably carbon fibers, glass fibers or aramid fibers, preferably impregnated with a liquid matrix so as to form a composite material. There are two main families of composite materials, depending on the type of matrix used. The thermoset composites and the thermoplastic composites, which are formed with a thermoset resin or a thermoplastic polymer as matrix.

A thermoset resin is formed by mixing two or more reactive components forming a reactive thermoset precursor, which react upon exposure to curing conditions (e.g., heat, UV or other radiations, or simply by contacting them with one another, etc.) to form the thermoset resin. The thermoset matrix must be fully cured to yield high performance composites. Once cured, the thermoset resin is solid and cannot be further processed or reshaped as the resin is unable to flow anymore. Examples of thermoset resins include unsaturated polyester, epoxy, vinyl ester, polyurea, isocyanurate, and polyurethane resins. It is possible to produce thermoset prepregs made of fibers impregnated with a reactive resin which has been only partially cured to make it tacky, but still soft. The prepregs can be stored and later further processed under pressure by heating or exposing the resin to UV to complete curing and consolidating the prepregs.

A thermoplastic polymer can pass from solid state (or non-flowable state) to a liquid state (or flowable state) and reverse by increasing and lowering the temperature, respectively. In case of semicrystalline polymers, lowering the temperature of the thermoplastic drives the formation of crystals and the solidification of the thermoplastic. Inversely, heating a semi-crystalline polymer above the melting temperature thereof melts the crystals and the thermoplastic can flow. Examples of semi-crystalline thermoplastics include polyether ketones such as PEEK, PEKK, PEKKEK, polyamides, such as PA6, PA66, PA10, PA12, polyolefins such as PE, PP, and the like. Amorphous thermoplastics do not form crystals and do not have a melting temperature. The amorphous thermoplastics solidify or become flowable depending on whether the material temperature is below or above the glass transition temperature thereof. Examples of amorphous thermoplastics include PEI, PSU, PES, PC, PS, TPU, and the like. Both semi-crystalline and amorphous thermoplastics can therefore be reshaped by heating them above their melting or glass transition temperatures and frozen into their new shape by lowering the temperature accordingly. Even though not strictly correct from a physical point of view, for sake of simplicity, both semi-crystalline and amorphous thermoplastics in a liquid state are herein referred to as a "thermoplastic melt".

Advantageously, the process further comprises a step consisting of translating the winding support and/or the at least one feeding device along the pitch axis of the winding support with respect to the base, in synchronization with the other steps.

Advantageously, the process further comprises a step consisting of translating the winding support and/or the at least one feeding device along the yaw axis of the winding support with respect to the base, in synchronization with the other steps.

Advantageously, the process further comprises a step consisting of translating the at least one feeding device and/or the winding support along the roll axis of the winding support in opposite directions, in synchronization with the other steps.

All these degrees of freedom provided to the movements of the winding support permit to further optimize the pathing and the pace of the filament fed by the at least one feeding device to the winding support, thus further reducing the winding process duration.

Advantageously, the process further comprises a step consisting of moving the at least one feeding device relative to the winding support or moving the winding support relative to at least one feeding device, in synchronization with the other steps.

The movement in space is coordinated with the deposition path of the filament in such a way that the instantaneous stress and strain induced on the filament is minimized, by moving relatively the winding support and the at least one feeding device, when wrapping around the shorter dome-shaped longitudinal ends of the winding support and when moving close to the winding support when wrapping around the central cylindrical part of the winding support, which typically takes up more filament.

This also allows for several other improvements of the invention: better compensation of the variations in filament application speed, by for example pulling the filament with the winding support during its application; increased lay-off accuracy with the possibility to place the feeding device as close as possible to the winding support; and more stable positioning of the filament in space can be configured. Higher precision of the filament winding is possible the closer the at least one feeding device is located with respect to the winding support. The increased accuracy, precision and stability improve the reproducibility of the process.

Advantageously, the at least one feeding device being fed with the filament by a filament material unwinder and/or a filament resin impregnation system, the step (iiiA) further comprises rotating the filament material unwinders and/or the filament resin impregnation system around a yaw axis of the winding support.

This allows to obtain a twist-free filament feeding of the at least one feeding device to the winding support.

Advantageously, step (iiiA) consists in rotating the at least one feeding device around the yaw axis of the winding support with respect to the base and rotating the winding support around the roll axis of the winding support with respect to the base, these two rotations occurring in opposite directions.

These two rotations occurring in opposite directions generate a contra motion of the winding support with respect to the at least one feeding device which increases the rotation speed of the winding support with respect to the at least one feeding device. This contra motion is achievable when the filament is winded under the form of circular hoops around the winding support or following a medium or high helical winding pattern.

Advantageously, the filament is fed to the winding support by mean of multiple feeding devices, preferably two feeding devices.

The additional feeding device or devices allows to multiply the winding speed. In the case of two feeding devices, winding speed is multiplied by up to 2 and the winding process is not complexified that much, making it as easy to implement.

It is also provided according to the invention a process for manufacturing a pressure vessel, the process comprising the process for winding a filament around a winding support as presented above.

It is also provided according to the invention a system for winding a filament on a winding support having a general cylindrical shape with dome-shaped longitudinal ends and having a roll axis, the system comprising:
  a base,
  a holding device, connected to the base, which comprises
    a frame configured to hold the winding support such that the winding support is able to rotate with respect to the base relative to a pitch axis of the winding support, and
  at least one feeding device arranged to feed a filament towards the frame,
  the system being characterized in that the at least one feeding device is configured to rotate with respect to the base around a yaw axis of the winding support.

This system allows the implementation of the winding process as described above where step (iiiA) occurs.

It is also provided according to the invention a system for winding a filament on a winding support having a general cylindrical shape with dome-shaped longitudinal ends and having a roll axis, the system comprising:
  a base,
  a holding device, connected to the base, which comprises
    a frame configured to hold the winding support such that the winding support is able to rotate with respect to the base relative to a pitch axis of the winding support, and
  at least one feeding device arranged to feed a filament towards the frame,
  the system being characterized in that the frame is configured to unlimitedly rotate with respect to the base around a yaw axis of the winding support.

This system allows the implementation of the winding process as described above where step (iiiB) occurs.

By the expression "to unlimitedly rotate", it is meant that multiple full rotations are possible. In the context of the system as recited, it means that the frame can make multiple full rotations with respect to the base around the yaw axis of the winding support. In other words, it means that the rotation span of the frame is higher than 360°.

Advantageously, the frame and the at least one feeding device are configured to be able to move in relative motion to another.

This allows to reduce instant filament take up when winding a non-spherical cylindrical winding support.

Advantageously, the winding support and/or the at least one feeding device are configured to translate along the pitch axis of the winding support with respect to the base.

Advantageously, the winding support and/or the at least one feeding device are configured to translate along the yaw axis of the winding support with respect to the base.

Advantageously, the winding support and/or the at least one feeding device are configured to translate along the roll axis of the winding support with respect to the base.

All these degrees of freedom provided to the movements of the winding support permit to further optimize the pathing and the pace of the filament fed by the at least one feeding device to the winding support, thus further reducing the winding process duration.

Advantageously, the frame is further configured to rotate unlimitedly around the roll axis of the winding support.

It is thus possible to move the frame to prevent depositing the filament on the frame, which is useless and thus represent a loss a filament and time lost not spent on winding the winding support.

Advantageously, the system comprises a command device, common to both the holding device and the at least one feeding device, configured to command, in synchronization, the movements of the holding device, the movement of the at least one feeding device and take up speed of the filament that is applied by the at least one feeding device.

The command of all the elements of the system is thus centralized by the only command device, which allows an easier synchronization of the steps of the winding process.

Advantageously, the holding device comprises an articulated arm, preferably a six-axis robot, a Cartesian coordinate robot or a Selective Compliance Articulated Robot Arm robot.

These types of robotic articulated arms are convenient to provide the necessary degrees of freedom to the winding support while being easy to command.

Advantageously, the system comprises multiple feeding devices, preferably two feeding devices.

The additional feeding device or devices allows to multiply the winding speed. In the case of two feeding devices, winding speed is multiplied by up to 2 and the winding process is not complexified that much, making it almost as easy to implement.

It is also provided according to the invention a non-transitory computer-readable medium comprising instructions which, when executed by a processor, cause the processor to perform a process as presented above.

BRIEF DESCRIPTION OF THE FIGURES

Other features and advantages would appear by reading the following description, given as an illustrative and non-restrictive example, and with the annexed drawings in which.

DETAILED DESCRIPTION

Figure 1:
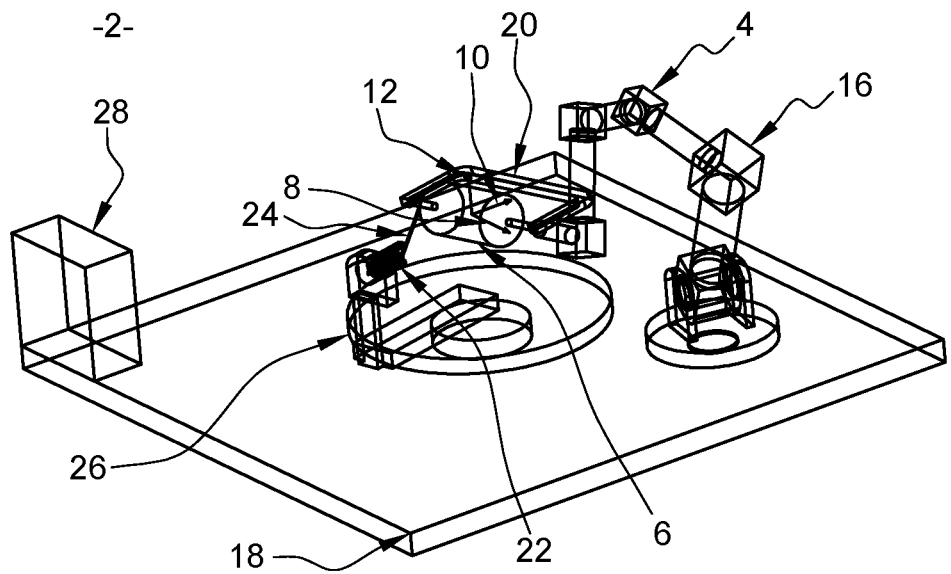
FIG. 1 is a three-dimensional view of a system for winding a filament on a winding support according to a first embodiment of the invention.

FIG. 1 represents a system 2 for winding a filament on a winding support according to a first embodiment of the invention. In the following description, this system 2 will be referenced as "winding system".

The winding system 2 comprises a holding device 4 configured to hold a winding support 6 which is to be wound by carrying out a winding process according to the invention. The winding support 6 is intended to form part of a high pressure vessel for a vehicle. By the expression "high pressure vessel", it is meant to mean a pressure vessel intended for storing gas under pressure able to withstand an internal pressure going up to 350 bar. As such, the winding support 6 may be a bladder under the form of a mandrel. The winding support 6 has a general cylindrical shape defining a longitudinal axis of the winding support 6.

By considering an origin formed by the center of gravity of the winding support 6, we can define a three-dimensional coordinate system comprising three axes, i.e., a roll axis 8, a pitch axis 10 and a yaw axis 12, by reference to the name of the principal axes of an aircraft defined for example in the manual "Aerodynamics" by Clancy, L. J., Pitman Publishing Limited (1975), ISBN 0-273-01120-0, Section 16.6. The roll axis 8 is preferably collinear to the longitudinal axis and pass through the center of gravity of the winding support 6. The yaw axis 12 is vertical and passes through the center of gravity of the winding support 6. The pitch axis 10 is perpendicular to the roll axis 8 and passes through the center of gravity of the winding support 6. The center of gravity of the winding support 6, the roll axis 8, the pitch axis 10 and the yaw axis 12 are represented on FIG. 1.

The winding support 6 has a central portion having a cylindrical shape and two dome-shaped longitudinal ends 14 located at opposing sides of the central portion relative to the roll axis 8. The winding support 6 comprises at least one boss located at one of the dome-shaped longitudinal ends 14. Preferably, the winding support 6 comprises two bosses located at both of the dome-shaped longitudinal ends 14.

The holding device 4 comprises an articulated arm 16 connected to a base 18 of the winding system 2. The articulated arm 16 is configured to allow a high number of degrees of freedom to the movement of the winding support 6 with respect to the base 18. Here, the articulated arm 16 is formed by a six-axis robot, a Cartesian coordinate robot or a Selective Compliance Articulated Robot Arm robot, often referenced as SCARA robot, but it is possible to replace these types of robot by any other suitable means.

The holding device 4 comprises a frame 20 mounted on an extremity of the articulated arm 16. The frame 20 has a general shape of a "U" which is dimensioned to accommodate the winding support 6 within the shape of the frame 20. The winding support 6 is held by the frame 20 by clamping the boss or the bosses of the winding support 6.

The frame 20 is configured to hold the winding support 6 such that the winding support 6 is able to rotate with respect to the base 18 relative to the pitch axis 10 of the winding support 6. The frame 20 has a roll axis, a pitch axis and a yaw axis which are collinear to the roll axis 8, the pitch axis 10 and the yaw 12 axis of the winding support 6, respectively.

The frame 20 is further configured to rotate with respect to the articulated arm 14 relative to the yaw axis 12 and to translate along the roll axis 8 with respect to the articulated arm 14.

The winding system 2 comprises at least one feeding device 22 arranged to feed a filament 24 towards the frame 20 and the winding support 6. The filament 24 is made of reinforcing fibres embedded in a resin shaped as a band to be wound all around the winding support 6. Here, the winding system 2 comprises one feeding device, but according to a variant of the invention, more feeding devices may be provided, preferably two feeding devices located at opposite positions from each other with respect to the yaw axis 12 of the winding support in order to double the winding speed.

The feeding device 22 comprises a winding eye through which the filament 24 pass in direction of the winding support 6. The filament 24 is continuously provided by a feeding station 26, connected to the base 16, equipped with filament material unwinders (not represented) and/or a filament resin impregnation system (not represented) in case in-line impregnation must be provided.

The feeding device 22 is equipped with actuators and brakes configured to speed up or slow down the quantity of filament 24 fed to the winding support 6 during the winding. The feeding station 26 may also be equipped with such actuators and brakes.

The winding system 2 comprises a command device 28 common to both the holding device 4 and the feeding device 22, configured to command, in synchronization, the movements of the holding device 4, the movement of the feeding device 22 and take up speed of the filament 24 that is applied by the feeding device 22.

The command device 28 is suitable for implementing a winding process comprising the steps, occurring in synchronization by the means of the command device 28, consisting of:
 (i) feeding the filament 24, by means of at the feeding device 22, towards the winding support 6,
 (ii) rotating the winding support 6 with respect to the base 18 around the pitch axis 10 of the winding support 6,
 (iiiA) rotating unlimitedly the feeding device 22 around the yaw axis 12 of the winding support 6 with respect to the base (18), and/or
 (iiiB) rotating unlimitedly the winding support 6 around the yaw axis 12 of the winding support 6 with respect to the base 18, and
 (iv) rotating unlimitedly the winding support 6 with respect to the base 18 around the roll axis 8 of the winding support 6.

The process follows a general polar winding type of technique, while allowing not strict polar winding patterns. The winding process allows different types of winding patterns.

Figure 2:
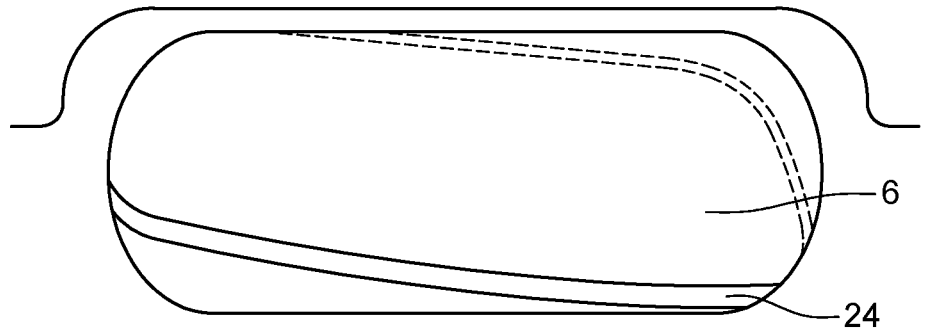
FIGS. 2 to 5 illustrate different winding patterns permitted by a winding process according to the invention carried out by the system of FIG. 1.

FIG. 2 illustrates a first implementation of the winding process in which the filament 24 is wound around the winding support 6 according to a low angle helical winding. The filament 24 is laid with an angle relative to the roll axis 8 of the winding support 6 lower than 20°. The roll axis 8, the pitch axis 10 and the yaw axis 12 of the winding support 6 are fixed and the centre of gravity of the winding support 6 is held stable at its position during the winding process. The feeding device 22 is rotated with respect to the winding support 6 around the yaw axis 12 while the winding support 6 is tilted around its pitch axis 10. Height position of the winding support 6 is compensated during the winding process by translation along the yaw axis 12 by both the winding support 6 and the feeding device 22, in opposite directions to increase the relative speed of the winding support 6 with respect to the feeding device 22. The winding support 6 is also translated along its pitch axis 10 with respect to the feeding device 22 in order to make them closer to each other or further to each other, to give an elliptic path to the feeding device 22. The frame 20 is kept at an opposing position of the feeding device 22 to prevent any deposition of the filament 24 on the frame 20. The rotations and translations are also accommodated to prevent laying the filament 24 on the boss or bosses of the winding support 6.

Figure 3:
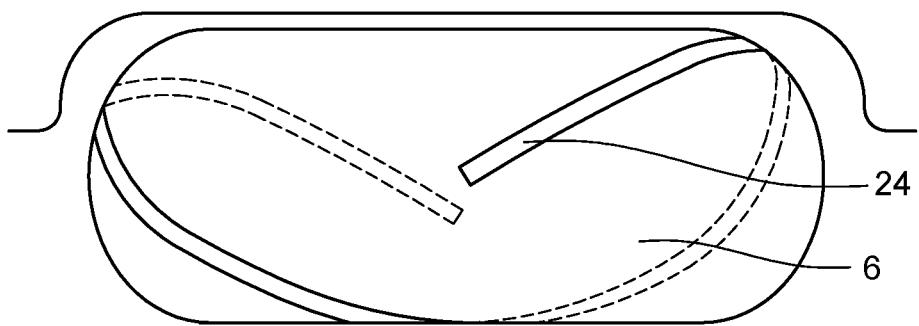

FIG. 3 illustrates a second implementation of the winding process in which the filament 24 is wound around the winding support 6 according to a medium angle helical winding. The filament 24 is laid with an angle relative to the roll axis 8 of the winding support 6 comprised between 20° and 55°. The feeding device 22 is rotated with respect to the winding support 6 around the yaw axis 12 while the winding support 6 is tilted up and down around its pitch axis 10 respectively to distribute the angle pattern. The winding support 6 is also translated along its pitch axis 10 with respect to the feeding device 22. The frame 20 is kept at an opposing position of the feeding device 22 to prevent any deposition of the filament 24 on the frame 20. The rotations and translations are also accommodated to prevent laying the filament 24 on the boss or bosses of the winding support 6.

Figure 4:
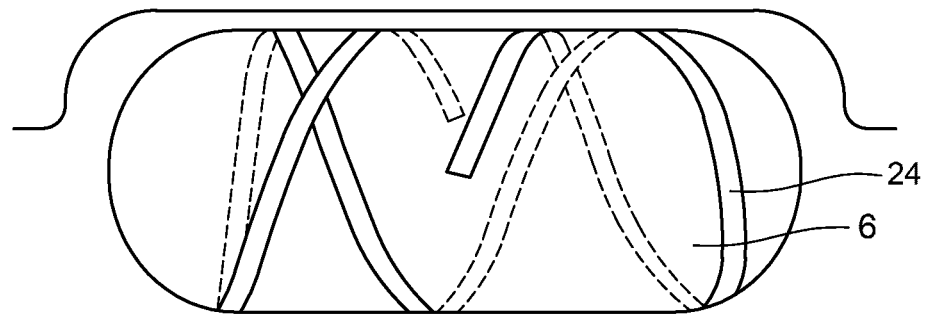

FIG. 4 illustrates a third implementation of the winding process in which the filament 24 is wound around the winding support 6 according to a high angle helical winding. The filament 24 is laid with an angle relative to the roll axis 8 of the winding support 6 comprised between 55° and 85°. The feeding device 22 is rotated with respect to the winding support 6 around the yaw axis 12 while the winding support 6 move up and down along the yaw axis 12 to distribute the angle pattern. The winding support 6 is also translated along its pitch axis 10 with respect to the feeding device 22 in order to make them closer to each other or further to each other, to give an elliptic path to the feeding device 22. The frame 20 is kept at an opposing position of the feeding device 22 to prevent any deposition of the filament 24 on the frame 20. The rotations and translations are also accommodated to prevent laying the filament 24 on the boss or bosses of the winding support 6.

Figure 5:
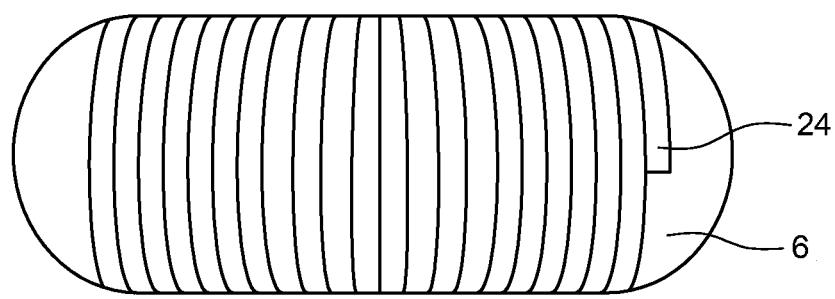

FIG. 5 illustrates a fourth implementation of the winding process in which the filament 24 is wound around the winding support 6 according to a circular hoop winding. The filament 24 is laid with an angle relative to the roll axis 8 of the winding support 6 higher than 85°. The feeding device 22 is rotated with respect to the winding support 6 around the yaw axis 12 while the winding support 6 move up and down along the yaw axis 12 to distribute the angle pattern. The winding support 6 may be rotated around its roll axis 8 during the rotation of the feeding device 22 to create a contra rotation, speeding up the winding process. The frame 20 is kept at an opposing position of the feeding device 22 to prevent any deposition of the filament 24 on the frame 20.

Depending on the selected pattern, not all the previously listed steps of the process have to be carried out. In other words, the determination of the pattern is made by selecting and parameterizing the different movements of the winding support 6, the frame 20 and the feeding device 22.

Figure 6:
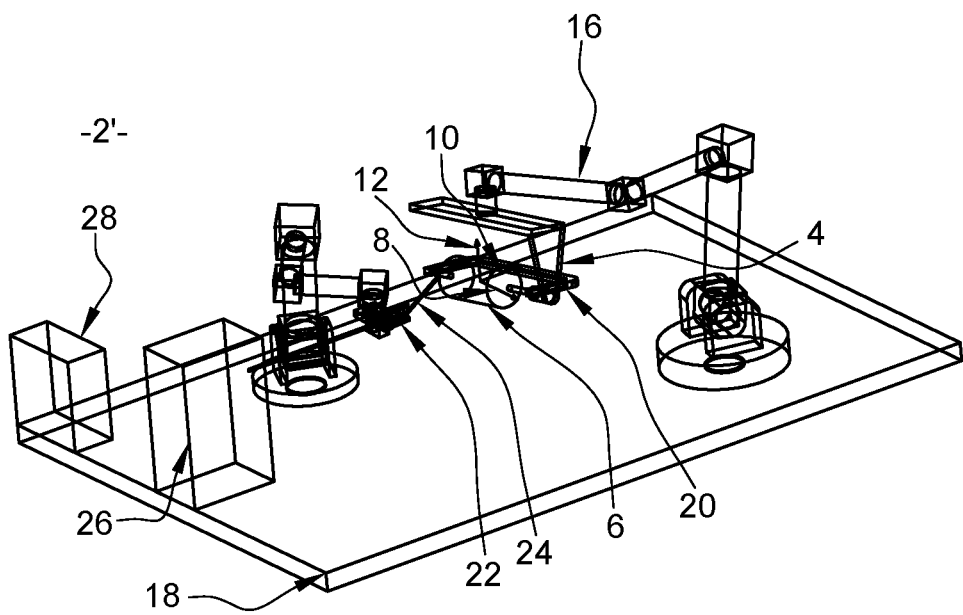
FIG. 6 is a three-dimensional view of a system for winding a filament on a winding support according to a second embodiment of the invention.

FIG. 6 represents a winding system 2' for winding a filament on a winding support according to a second embodiment of the invention. It differs from the winding system of the first embodiment in that the feeding device 22 is no longer configured to rotate around its yaw axis. Instead, the winding support 6 is configured to rotate around its yaw axis 12, thanks to the holding device 4, with respect to the base 18. In this way, the relative movement between the winding support 6 and the feeding device 22 remains the same. Therefore, the winding systems 2' enables the implementation of the same winding process, previously described, as the winding system of the first embodiment. All the other features of the feeding system of the first embodiment are transposable to the winding system 2'.

The here-above embodiments are illustrative and not restrictive embodiments.

Obviously, many modifications and variations of the present invention are possible in the light of the above teachings without deviating from its inventive concept. It has therefore to be understood that the invention may be practiced otherwise that as specifically described.

NUMERICAL REFERENCES

2; 2': winding system
4: holding device
6: winding support
8: roll axis of the winding support
10: pitch axis of the winding support
12: yaw axis of the winding support
14: dome-shaped ends of the winding support
16: articulated arm
18: base
20: frame
22: feeding device
24: filament
26: feeding station
28: command device

The invention claimed is:

1. A process for winding a filament around a winding support,
wherein the winding support has a cylindrical shape with dome-shaped longitudinal ends and a roll axis,
wherein the winding support is held by a holding device fixed to a base, and
wherein the process comprises the following occurring in synchronization;
feeding a filament, by means of at least one feeding device, towards the winding support,
rotating the winding support with respect to the base around a pitch axis of the winding support,
rotating unlimitedly the at least one feeding device around a yaw axis of the winding support with respect to the base, and/or rotating unlimitedly the winding support around the yaw axis of the winding support with respect to the base, and
rotating unlimitedly the winding support with respect to the base around the roll axis of the winding support.

2. The process according to claim 1, further comprising translating the winding support and/or the at least one feeding device along the pitch axis of the winding support with respect to the base, in synchronization with the process.

3. The process according to claim 1, further comprising translating the winding support and/or the at least one feeding device along the yaw axis of the winding support with respect to the base, in synchronization with the process.

4. The process according to claim 1, further comprising translating the at least one feeding device and/or the winding support along the roll axis of the winding support in opposite directions, in synchronization with the process.

5. The process according to claim 1, further comprising moving the at least one feeding device relative to the winding support or moving the winding support relative to at least one feeding device, in synchronization with the process.

6. The process according to claim 1, wherein during the rotating unlimitedly the at least one feeding device step the at least one feeding device is a filament material unwinder and/or a filament resin impregnation system, and
wherein the process further comprises, in synchronization, rotating the filament material unwinder and/or the filament resin impregnation system around a yaw axis of the winding support.

7. The process according to claim 1, wherein the rotating unlimitedly the at least one feeding device comprises:
rotating the at least one feeding device around the yaw axis of the winding support with respect to the base and rotating the winding support around the roll axis of the winding support with respect to the base
wherein the two rotations occur in opposite directions.

8. The process according to claim 1, wherein the filament is fed to the winding support by multiple feeding devices.

9. A process for manufacturing a pressure vessel, comprising the process for winding a filament around a winding support according to claim 1.

10. A system for winding a filament on a winding support,
wherein the winding support has a cylindrical shape with dome-shaped longitudinal ends and a roll axis,
wherein the system comprises:
a base,
a holding device connected to the base, wherein the holding device comprises a frame configured to hold the winding support such that the winding support is able to rotate with respect to the base relative to a pitch axis of the winding support, and
at least one feeding device arranged to feed a filament towards the frame,
wherein the at least one feeding device is configured to rotate with respect to the base around a yaw axis of the winding support.

11. A system for winding a filament on a winding support,
wherein the winding support has a cylindrical shape with dome-shaped longitudinal ends and a roll axis,
wherein the system comprises:
a base (18),
a holding device connected to the base, wherein the holding device comprises a frame configured to hold the winding support such that the winding support is able to rotate with respect to the base relative to a pitch axis of the winding support, and
at least one feeding device arranged to feed a filament towards the frame,
wherein the frame is configured to unlimitedly rotate with respect to the base around a yaw axis of the winding support.

12. The system according to claim 10, wherein the frame and the at least one feeding device are configured to be able to move in relative motion to another.

13. The system according to claim 10, wherein the winding support and/or the at least one feeding device are configured to translate along the pitch axis of the winding support with respect to the base.

14. The system according to claim 10, wherein the winding support and/or the at least one feeding device are configured to translate along the yaw axis of the winding support with respect to the base.

15. The system according to claim 10, wherein the winding support and/or the at least one feeding device are configured to translate along the roll axis of the winding support with respect to the base.

16. The system according to claim 10, wherein the frame is configured to rotate unlimitedly around the roll axis of the winding support.

17. The system according to claim 10, further comprising a command device, wherein the command device is common to both the holding device and the at least one feeding device, and wherein the command device is configured to command, in synchronization, movements of the holding device, the movement of the at least one feeding device, and take up speed of the filament that is applied by the at least one feeding device.

18. The system according to claim 10, wherein the holding device comprises an articulated arm selected from a six-axis robot, a Cartesian coordinate robot or a Selective Compliance Articulated Robot Arm robot.

19. The system according to claim 10, comprising multiple feeding device.

20. A non-transitory computer-readable medium comprising instructions which, when executed by a processor, cause the processor to perform the process according to claim 1.

* * * * *